United States Patent
Shepherd et al.

(10) Patent No.: US 10,260,994 B2
(45) Date of Patent: Apr. 16, 2019

(54) SUSPENSION STRUT SERVICING

(71) Applicant: Airbus Operations Limited, Bristol (GB)

(72) Inventors: Alan Shepherd, Bristol (GB); Julian Duncan, Bristol (GB)

(73) Assignee: Airbus Operations Limited, Bristol (GB)

( * ) Notice: Subject to any disclaimer, the term of this patent is extended or adjusted under 35 U.S.C. 154(b) by 580 days.

(21) Appl. No.: 14/891,599

(22) PCT Filed: May 9, 2014

(86) PCT No.: PCT/GB2014/051425
§ 371 (c)(1),
(2) Date: Nov. 16, 2015

(87) PCT Pub. No.: WO2014/184521
PCT Pub. Date: Nov. 20, 2014

(65) Prior Publication Data
US 2016/0101877 A1    Apr. 14, 2016

(30) Foreign Application Priority Data
May 16, 2013 (GB) .................................. 1308879.4

(51) Int. Cl.
*G01M 17/00*     (2006.01)
*G01M 17/04*     (2006.01)
(Continued)

(52) U.S. Cl.
CPC ............. *G01M 17/04* (2013.01); *B64C 25/60* (2013.01); *B64F 5/60* (2017.01); *G01F 23/296* (2013.01);
(Continued)

(58) Field of Classification Search
CPC .......... B64F 5/0045; B64F 5/60; B64C 25/60; B64C 2230/02; G01M 17/04; G01F 23/296
See application file for complete search history.

(56) References Cited

U.S. PATENT DOCUMENTS 2,955,625 A    10/1960   Patterson
3,889,904 A    6/1975   Jones et al.
(Continued)

FOREIGN PATENT DOCUMENTS

CA     2 587 750 A1    5/2006
CN     201721619 U    1/2011
(Continued)

OTHER PUBLICATIONS

International Search Reported PCT/GB2014/051425 dated Jul. 16, 2014, three pages.

*Primary Examiner* — Richard Chang
(74) *Attorney, Agent, or Firm* — Nixon & Vanderhye P.C.

(57) ABSTRACT

A method for servicing a landing gear strut in service supporting an aircraft including: determining a current amount of damping fluid in the landing gear strut; determining a required amount of the damping fluid for correct servicing of the landing gear strut; and adjusting the current amount of damping fluid in the landing gear strut so that the current amount of damping fluid complies with the required amount of damping fluid.

14 Claims, 10 Drawing Sheets

(51) Int. Cl.
    *G01F 23/296*     (2006.01)
    *B64F 5/60*     (2017.01)
    *B64C 25/60*     (2006.01)
    *F16F 9/06*     (2006.01)

(52) U.S. Cl.
    CPC .......... *B64C 2230/02* (2013.01); *F16F 9/063* (2013.01); *Y02T 50/166* (2013.01)

(56) References Cited

U.S. PATENT DOCUMENTS

| | | | | |
|---|---|---|---|---|
| 5,170,366 | A | * | 12/1992 | Passarelli ................. G01G 9/00 |
| | | | | 702/41 |
| 5,214,586 | A | * | 5/1993 | Nance .................... G01G 19/07 |
| | | | | 701/124 |
| 6,128,951 | A | * | 10/2000 | Nance .................... G01G 19/07 |
| | | | | 701/124 |
| 9,026,280 | B2 | | 5/2015 | Ding et al. |
| 2004/0129834 | A1 | | 7/2004 | Luce |
| 2006/0220917 | A1 | | 10/2006 | Nance |
| 2010/0017052 | A1 | | 1/2010 | Luce |
| 2012/0053783 | A1 | | 3/2012 | Nance |
| 2012/0253591 | A1 | | 10/2012 | Nance |

FOREIGN PATENT DOCUMENTS

| | | |
|---|---|---|
| CN | 102262686 | 11/2011 |
| DE | 196 43 956 A1 | 5/1998 |
| JP | 11-171097 | 6/1999 |
| WO | 93/16359 | 8/1993 |
| WO | 98/46972 A1 | 10/1998 |

\* cited by examiner

SUSPENSION STRUT SERVICING

RELATED APPLICATIONS

This application is the U.S. national phase of International Application No. PCT/GB2014/051425 filed 9 May 2014 which designated the U.S. and claims priority to GB 1308879.4 filed 16 May 2013, the entire contents of each of which applications are incorporated by reference.

FIELD OF INVENTION

The present invention relates to a method and apparatus for servicing a suspension strut.

BACKGROUND OF THE INVENTION

Aircraft landing gear are generally arranged to provide suspension and shock absorbing functions for the aircraft during landing and take-off. The suspension and damping functions may be provided in a single suspension strut in each landing gear. In such struts the suspension spring is commonly provided by one or more gas springs and damping is provided by hydraulic fluid. In use, a proportion of the gas or the hydraulic fluid escapes and needs to be replenished to a predetermined level so that the strut meets its required performance criteria.

The level of each of the fluids in a strut is often critical to ensure its correct performance. Servicing of such equipment therefore requires the accurate determination of the levels of the gas and the hydraulic fluid. Without such determination it is not possible to know whether a strut requires servicing or that it has been serviced correctly. In many struts the various fluid levels are not externally visible. As a result, accurate determination of the levels requires the introduction of suitable sensors or elaborate servicing techniques that involve moving the strut into a predetermined configuration and then following a prescribed refilling procedure. Such servicing procedures are time consuming, hazardous and difficult, especially if the strut is part of a large aircraft.

SUMMARY OF THE INVENTION

An embodiment of the invention provides a method for servicing a landing gear strut in service while supporting an aircraft, the method comprising the steps of:
measuring the level of damping fluid within the strut;
measuring the strut closure;
determining a required level of damping fluid for correct servicing of the landing gear strut in dependence on the measured strut closure; and
adjusting the amount of damping fluid in the landing gear so that the measured level of damping fluid complies with the required level of damping fluid level.

The required level of damping fluid may be determined in dependence on a predetermined required damping fluid volume for correct servicing of the landing gear strut and the internal volume of the damping fluid chamber of the strut for a predetermined range of strut closure.

The method may comprise the steps of: measuring the strut temperature; and determining the required level of damping fluid in dependence on the thermal expansivity of the required volume of damping fluid and the measured temperature. The method may comprise the steps of: measuring the strut temperature; and determining the required level of damping fluid in dependence on the thermal expansivity of the strut structure providing the damping fluid chamber and the measured strut temperature. The method may comprise the steps of: measuring the interior pressure of the strut; and determining the required level of damping fluid in dependence on the compression of the required volume of damping fluid in response to the measured pressure. The method may comprise the steps of: measuring the interior pressure of the strut; and determining the required level of damping fluid in dependence on the pressure dilation of the strut in response to the measured pressure.

The level of damping fluid level within the strut may be measured via a sensor associated with the strut. The sensor may comprise an ultrasonic transducer. The sensor may comprise an ultrasonic transducer array. The ultrasonic array may be driven in a pulse-echo mode. The strut closure may be measured via one or more sensors associated with the strut. The strut temperature may be measured via one or more sensors associated with the strut.

The method may comprise the steps of: measuring the strut closure when the measured level of damping fluid complies with the determined required level of damping fluid;
determining a required strut closure for correct servicing of the gas spring of the strut;
and adjusting the amount of gas in the strut so that the measured strut closure complies with the required strut closure. The required strut closure may be determined in dependence on the measured temperature and interior pressure of the strut.

Another embodiment provides a method for servicing a landing gear strut in service supporting an aircraft, the method comprising the steps of:
determining the current amount of damping fluid in the landing gear strut;
determining the required amount of damping fluid for correct servicing of the landing gear strut; and
if the current amount of damping fluid does not comply with the required amount of damping fluid then adjusting the amount of damping fluid in the landing gear strut so that the current amount of damping fluid complies with the required amount of damping fluid.

A further embodiment provides apparatus for servicing a landing gear strut in service while supporting an aircraft, the apparatus being operable to:
determine the current level of damping fluid in the landing gear strut;
determine the required level of damping fluid for correct servicing of the landing gear strut; and
if the current level of damping fluid does not comply with the required level of damping fluid then adjust the amount of damping fluid in the landing gear strut so that the current level of damping fluid complies with the required level of damping fluid.

Another embodiment provides apparatus for servicing a landing gear strut in service supporting an aircraft, the apparatus comprising:
sensor means for automatically determining the current amount of damping fluid in the landing gear strut;
service data means for determining the required amount of damping fluid for correct servicing of the landing gear strut; and
damping fluid adjusting means for adjusting the amount of damping fluid in the landing gear strut so that the current volume of damping fluid complies with the required volume of damping fluid.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
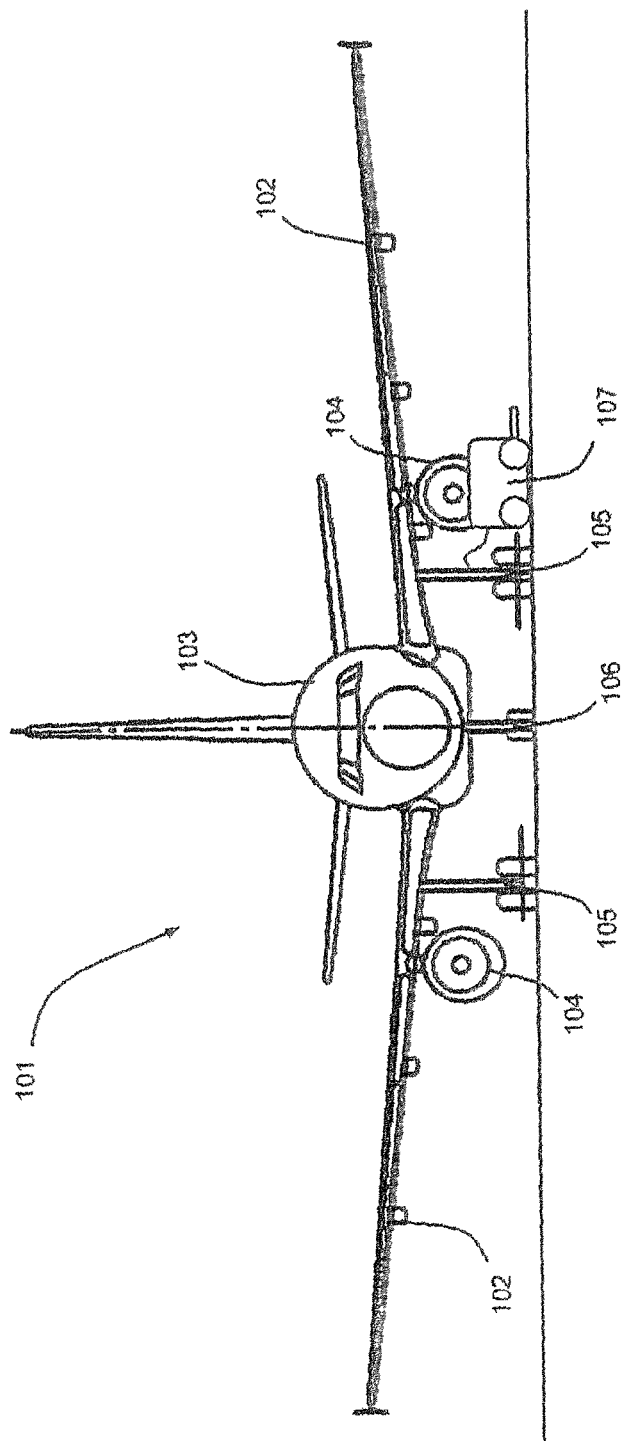
FIG. 1 is a schematic front view of an aircraft.

With reference to FIG. 1, an aircraft 101 comprises a pair of wings 102 faired into a fuselage 103. The wings each carry an engine 104. The aircraft 101 is supported on the ground by running gear in the form of a set of landing gear (LG) comprising main landing gear 105 and a nose landing gear 106. Each landing gear 105, 106 is provided with suspension and shock absorption functions. In the present embodiment, the aircraft 101 is connected to a portable apparatus in the form of a landing gear (LG) servicing cart 107. The LG servicing cart 107 is connected to one of the main landing gear 105 via a plurality of hoses and cables (only one connection is show in FIG. 1 for clarity) and is arranged to automatically service the attached landing gear 105 as described in further detail below.

Figure 2:
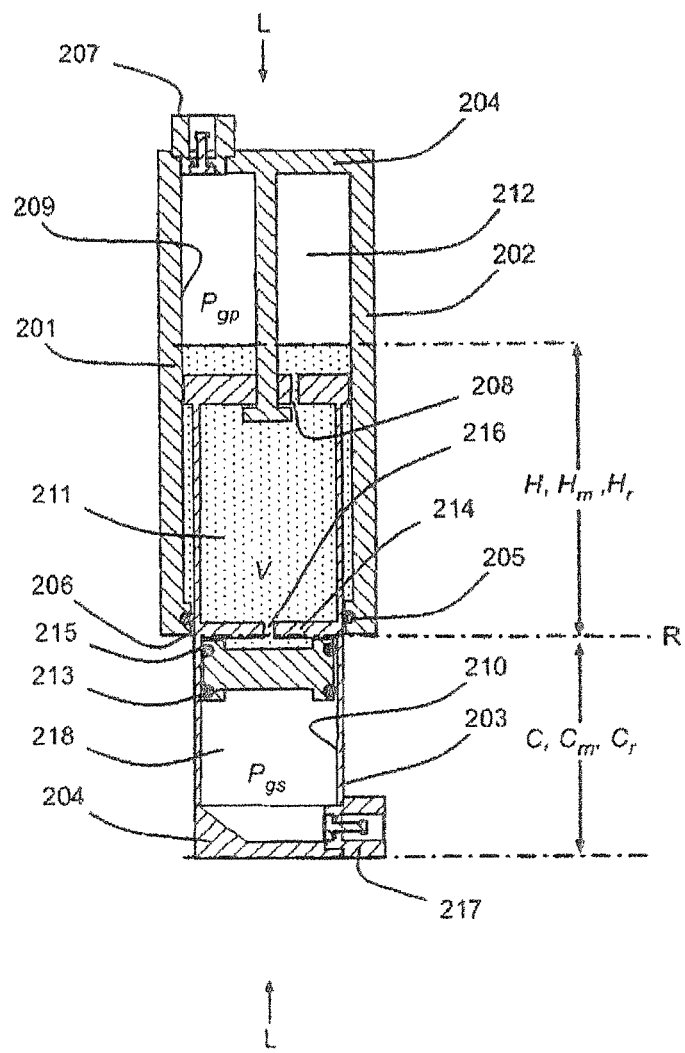
FIG. 2 is a cross sectional view of a landing gear strut in the aircraft of FIG. 1.

With reference to FIG. 2, in the present embodiment, each landing gear 105, 106 comprises a dual stage strut 201 comprising a hollow generally cylindrical vessel having a hollow cylindrical upper part 202 and a hollow cylindrical lower part 203. The respective distal ends 204 of the upper and lower 202, 203 parts are closed. The lower part 203 is arranged to slide within the upper part 202 so that the strut 201 is telescopic. A fluid-tight seal 205 is provided on the inner surface of the upper part 202 generally adjacent to its proximal open end 206. The inner surface of the upper part 202 forms the main bearing of the strut 201. A primary valve 207 is fitted in the closed end 204 of the upper part 202 and arranged to enable the controlled insertion or extraction of fluid into or out of the primary interior chambers of the strut 201.

The proximal open end of the lower part 203 comprises a restricted opening 208 arranged to provide resistance for fluid flow between the respective primary interior chambers 209, 210 of the two parts 202, 203. The interior chambers 209, 210 are filled with a liquid in the form of hydraulic fluid 211 and a gas 212 in the form of nitrogen. The gas 212 is arranged to provide a primary gas spring 212 thus providing part of the suspension function of the dual stage strut 201. The hydraulic fluid 211 is forced through the restrictive opening 208 by the relative sliding of the two parts 202, 203 thereby acting to damp the relative movement and thus provides a shock absorption function for the primary gas spring 212 of the strut 201.

The lower part 203 of the dual stage strut 201 houses a free piston 213 arranged to slide axially within the lower part of the interior chamber 210. The lower chamber 210 further comprises a wall 214 arranged to restrict the movement of the piston 213 within the lower end of the lower part 203. The piston 213 is provided with seals 215 providing a fluid tight seal between the piston 213 and the interior wall of the lower chamber 210. The wall 214 comprises an opening 216 providing fluid communication between the upper and lower ends of the lower chamber 210. A secondary valve 217 is fitted adjacent the closed end 204 of the lower part 203 and arranged to enable the controlled insertion or extraction of fluid into or out of the lower chamber 210 of the strut 201. The part of the lower chamber between the closed end 204 and the piston 213 is filled with gas 218 in the form of a secondary gas spring 218 for the dual stage strut 201.

Under relatively low loading, the pressure in the secondary gas spring 218 is arranged to be significantly higher than in the primary gas spring 212. Thus the pressure in the secondary gas spring 218 biases the piston 213 to its uppermost position abutting the wall 214. As the load on the strut 201 increases the primary spring 212 compresses and its pressure increases accordingly in the primary suspension stage of the strut 201. When the pressure of the primary gas spring 212 equals that in the secondary gas spring 218 then both spring begin to compress in tandem under further load in the secondary suspension stage of the strut 201. In FIG. 2, the strut 201 is shown compressed by a relatively light load L. The hydraulic fluid 211 is provided at a required level H, which equates to a liquid volume V. The primary gas spring 212 is at a pressure $P_{gp}$ and the secondary gas spring 218 is inactive at a comparatively higher pressure $P_{gp}$.

The strut 201 is designed to operate within a predetermined performance envelope and to do so the amounts of the hydraulic fluid 211 and gas in each of the gas springs 212, 218 must be provided within predetermined limits. Since amounts of both hydraulic fluid 211 and gas 212, 218 are lost in use, the strut must be serviced at predetermined intervals to ensure that the levels of hydraulic fluid 211 and gas 212, 218 remain within the required limits. To enable the correct servicing of the strut 201, servicing data for the landing gear 105, 106 defines the required limits for the hydraulic fluid 211 and gas 212, 218 taking into account ambient conditions. Assuming the hydraulic fluid level H is correct, the closure C of the strut 201 under relatively light load is a function of the pressure $P_{gp}$ and the temperature $T_{gp}$ of the primary gas spring 212. The servicing data therefore also indicates the required closure $C_r$ for a given pressure $P_{gp}$ and the temperature $T_{gp}$ of the gas in the primary gas spring 212 for the strut 201 under light load. The servicing data also indicates the required pressure $P_{gs}$ for the inactive secondary gas spring 218.

Under heavy load, both the primary & secondary gas springs 212, 218 become operational, that is, $P_{gs}=P_{gp}$. Therefore, assuming the hydraulic fluid level H is correct and that the primary gas spring 212 comprises the correct amount of gas, the compression of the strut 201 under heavy load, and hence its closure C, is a function of the pressure and the temperature of both the primary and secondary gas springs 212, 218. The servicing data further indicates the required closure $C_r$ for a given pressure $P_g$ and the temperature $T_g$ of the gas in the primary and secondary gas spring 212, 218 for the strut 201 under heavy load.

Figure 3:
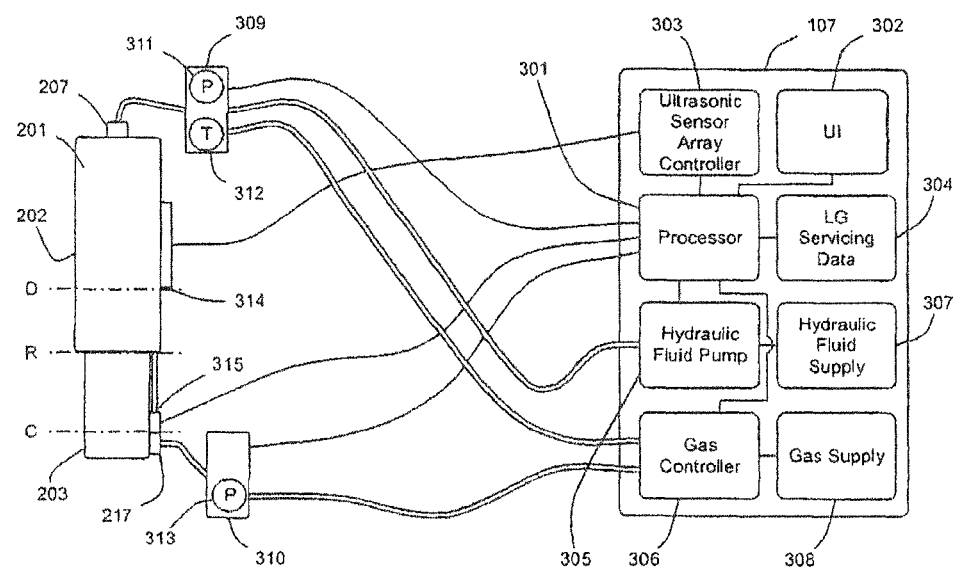
FIG. 3 is a schematic view of an automatic landing gear servicing apparatus for servicing the strut of FIG. 2.

With reference to FIG. 3, the automatic LG servicing cart 107 comprises a processor 301 in communication with a user interface 302, an ultrasonic sensor array controller 303, landing gear servicing data 304 for one or more selected landing gears, a hydraulic fluid pump 305 and a gas controller 306. The servicing cart 107 also comprises a hydraulic fluid supply 307 connected to the hydraulic fluid pump 305 and a nitrogen gas supply 308 connected to the gas controller 306.

The servicing cart 107 further comprises two manifolds in the form an upper manifold 309 with a hydraulic connection to the hydraulic fluid pump 305 and a gas connection to the gas controller 306, and a lower manifold 310 with a gas connection to the gas controller 306. The manifolds 309, 310 are connected respectively to the upper and lower valves 207, 217 of the strut 201. The upper manifold 309 is provided with an electrical connection to the processor 301 that enables the processor to control the input or output of gas or input of hydraulic fluid to the strut 201. The upper manifold 309 is further provided with pressure and temperature sensors 311, 312 arranged to provide temperature T and pressure $P_{gp}$ data for the gas in the primary gas spring 212 to the processor 301 via the upper manifold electrical connection. The lower manifold 310 is provided with a pressure sensor 313 arranged to provide pressure $P_{gs}$ data for the gas in the secondary gas spring 218 to the processor 301 via the lower manifold electrical connection. In the present embodiment, the temperature of the gas in the secondary gas spring 218 is assumed to be identical to the temperature T of the gas in the primary gas spring 212 as measured by the temperature sensor 312.

In the present embodiment, the servicing cart 107 also comprises two ancillary sensors in the form of an ultrasonic transducer array 314 electrically connected to the ultrasonic sensor array controller 303, and means for measuring closure of the strut 201 in the from of a digital micrometer 315 electrically connected to the processor 301. The ultrasonic array 314 is attached to the sidewall of the upper part 202 of the strut 201 at a predetermined fixed position. For the strut 201 of the present embodiment, the digital micrometer 315 is attached to the lower part 203 of the strut 201 and the lower edge of the upper part 202 of the strut 201, that is, the lower edge of the main bearing for the strut 201.

The user interface (UI) 302 is arranged to enable user control of the operation of the servicing cart 107. In the present embodiment, the user interface enables a user to input a start command to initiate the operation of the serving cart 107 and to select the specific landing gear to which the servicing cart 107 is attached so as to enable the correct LG service data to be selected from the stored service data 304. The user interface 302 also provides an indication to the user of when the servicing of the strut 201 has been successfully completed or provides feedback on faults in the case of a failed servicing operation.

The hydraulic fluid pump 305 is arranged to deliver a measured volume of hydraulic fluid at a suitable pressure from the hydraulic fluid supply 307 to the upper valve 207 via the upper manifold 309. The delivery of hydraulic fluid is performed in response to control signals issued by the control of the processor 301. The processor 301 also controls of the manifold 309 so as to route the delivered hydraulic fluid to the upper valve 207. Similarly, the gas controller 306 is arranged to deliver nitrogen from the gas supply 308 to a selected one of the upper or lower valves 207, 217 via the respective upper or lower manifold 309, 310. The delivery of gas is performed by the gas controller 306 in response to control signals issued by the processor 301. The processor 301 also issues control signals to the relevant manifold 309, 310 so as to route the delivered gas to the relevant valve 207, 217 as appropriate.

The ultrasonic sensor array controller 303 is arranged to operate the ultrasonic transducer array 314 so as to measure the hydraulic fluid level $H_m$ in the strut 201 and to input this to the processor 301. The manner in which the ultrasonic sensor array controller 303 and the ultrasonic transducer array 314 operate will be described further below with reference to FIGS. 4, 5a and 5b.

The processor 301 is programmed to control the servicing of the strut 201 by the servicing cart 107 in accordance with servicing parameters for the strut 201 specified by the LG servicing data 304. For a dual stage strut comprising two gas springs, as in the present embodiment, the processor 301 is arranged to fix the location of the floating piston 213 during servicing by forcing the floating piston 213 up against the wall 214 of the lower chamber 210 by over-pressurising the lower chamber 210. This technique eliminates the unknown parameter of the position of the floating piston 213. The position of the floating piston 213 does not therefore need to be considered when determining or adjusting the hydraulic fluid level.

Once the floating piston 213 has been fixed in its servicing position, the processor 301 is then arranged to measure the hydraulic fluid level $H_m$, via the ultrasonic sensor array controller 303 and to identify the required hydraulic fluid level $H_r$ from the LG servicing data 304 taking into account the loading and ambient conditions of the strut 201. If the measured hydraulic fluid level $H_m$ is less than the required hydraulic fluid level $H_r$, the processor is arranged to operate the hydraulic fluid pump 305 so as to top-up the hydraulic fluid in the strut 201 to the required hydraulic fluid level $H_r$ from the hydraulic fluid supply 307.

With the hydraulic fluid correctly serviced and the secondary gas spring 218 inactive in its servicing position, the compression of the strut 201, defined by its measured closure $C_m$ input from the digital micrometer 315, is a function of the pressure $P_{gp}$ and the temperature $T_{gp}$ of the gas in the primary gas spring 212. The processor 301 is thus arranged to identify the required closure $C_r$ from the LG servicing data 304 taking into account the measured pressure $P_{gp}$ and the temperature $T_{gp}$ of the gas in the primary gas spring 212. The processor 301 is then arranged to adjust the amount of nitrogen in the primary gas spring 212 by control of the gas controller 306 to raise or lower the strut 201 so that the measured closure $C_m$ equals the required closure $C_r$ and the primary gas spring 212 is thus correctly serviced.

Having correctly serviced the hydraulic fluid and the primary gas spring 212, the processor 301 then proceeds to control the servicing of the secondary gas spring 218 in accordance with the LG servicing data 304. The processor 301 first checks that the required pressure $P_{gs}$ for the secondary gas spring 218 meets or exceeds the actual pressure $P_{gp}$ of the primary gas spring 212 which indicates that the strut 201 is relatively lightly loaded and thus the secondary gas spring 218 is designed to be inactive. If this is the case the processor 301 proceeds to adjust the pressure $P_{gs}$ in the secondary gas spring 218 to the required pressure $P_{gs}$ defined in the LG servicing data 304 taking into account the measured temperature $T_{gp}$, by inserting or releasing nitrogen using the gas controller 306.

If the pressure $P_{gp}$ of the primary gas spring 212 exceeds the required pressure $P_{gs}$ in the secondary gas spring 218 this indicates that the strut 201 is relatively heavily loaded and that the secondary gas spring 218 should thus be active. In this case, the processor 301 is arranged to identify the required closure $C_r$ from the LG servicing data 304 taking into account the measured pressure $P_{gp}$ and the temperature $T_{gp}$ of the gas in the primary gas spring 218. The processor

301 is then arranged to adjust the amount of nitrogen in the secondary gas spring 218 by control of the gas controller 306 thus releasing the piston 213 from its fixed servicing position and lowering the strut 201 so that the measured closure $C_m$ equals the calculated closure $C_r$ and the secondary gas spring 212 is correctly serviced.

As noted above, the processor 301 is arranged to determine whether the measured level of hydraulic fluid $H_m$ in the strut 201 matches the required hydraulic fluid level $H_r$ for the strut 201 to be correctly serviced. In the present embodiment, the required level of hydraulic fluid $H_r$ is pre-calculated for a range of pressure P, temperature T and closure C of the strut 201 assuming that the secondary gas spring is inactive and forced to its uppermost position as noted above. The pre-calculated required hydraulic fluid levels $H_r$ are provided in a look-up table in the servicing data 304 for each relevant model of strut. The look-up table is indexed by the pressure $P_{gp}$ and temperature T of the gas in the primary gas spring 212 and the closure $C_m$ of the strut 201.

The LG servicing data 304 comprises relevant data for each type of landing gear for which the servicing cart 107 is programmed to automatically service. For example, for the strut 201 of FIG. 2, the data store 304 is arranged to store the following data in respective look-up tables for use by the processor 301:
1. the required level of hydraulic fluid $H_r$ indexed by $C_m$, $P_{gp}$ and T
2. the required closure $C_r$ indexed by $P_{gp}$ and T for the primary gas spring with the secondary gas spring forced to its servicing position;
3. the required closure $C_r$ indexed by $P_{gs}$ and T for an active secondary gas spring; and
4. the pressure $P_{gs}$ indexed by T for an inactive secondary gas spring.

In the present embodiment, the required level of hydraulic fluid $H_r$ is calculated on the basis of the hydraulic fluid level in the strut 201 in an unpressurised, fully extended state at 20° C. with the floating piston 213 at the top of the lower chamber 210. The calculation takes into account the change in the hydraulic fluid level as a result of the following modifying factors:
a) closure of the strut C;
b) compressibility of the hydraulic fluid;
c) thermal expansion of the hydraulic fluid;
d) dilation of the strut due to pressure; and
e) thermal expansion of the strut.

In the present embodiment, the required hydraulic fluid level $H_r$ is calculated relative to a predetermined reference point R, which, in the present embodiment, is the lower edge of the main bearing, that is the lower edge of the upper part 202 of the strut 201.

a) Closure of the strut: as the strut 201 closes the volume of gas in the upper chamber 209 decreases and is replaced by the volume of the lower part 203 in the form of a sliding tube. This volume change $\Delta V$ is equal to the closure C of the strut 201 multiplied by the cross-sectional area $A_1$ of the lower part 203, shown in equation 1 as follows:

$$\Delta V = C \times A_l$$

The change in height $\Delta H_1$ of the hydraulic fluid due to the closure of the strut is then the change in volume $\Delta V$ divided by the cross-sectional area of the upper part 202 $A_u$ of the strut 201, shown in equation 2 as follows:

$$\Delta H_1 = \frac{C \times A_l}{A_u}$$

b) Compressibility of the hydraulic fluid: In the present embodiment, the bulk modulus $\beta_s$ of the hydraulic fluid is itself a function of pressure. For a hydraulic fluid such as MiL-H-5606 commonly used in landing gear this can be approximated as follows:

$$\beta_s = 4.7136 P + 1418 \text{ MPa}$$

A change in volume $\Delta V$ of the hydraulic fluid, where $V_i$ is the initial volume of hydraulic fluid, is then given by equation 4 as follows:

$$\Delta V = -\frac{V_i P}{\beta_s}$$

The change in height $\Delta H_2$ of the hydraulic fluid due to its compressibility is given by equation 5 as follows:

$$\Delta H_2 = -\frac{V_i P}{\beta_s A_u}$$

c) Thermal expansion of the hydraulic fluid: The volumetric thermal expansion $\alpha_v$ of a hydraulic fluid such as MiL-H-5606 is $8.6 \times 10^{-4}$ C.$^{-1}$. This corresponds to a 2.58% change in volume for a temperature change of 30° C. The change in volume is represented in the following equation as:

$$\Delta V = V_i \alpha_v \Delta T$$

Thus the change in height $\Delta H_3$ of the hydraulic fluid due to its thermal expansion is given by equation 5 as follows:

$$\Delta H_3 = \frac{V_i \alpha_v \Delta T}{A_u}$$

Given a reference temperature for the servicing of the strut 201 of 20° C., $\Delta T$ is therefore $T_A - 20$, where $T_A$ is the fluid temperature in centigrade.

d) Dilation of the strut due to pressure: The pressure in the upper part 202 of the strut 201 causes it to dilate, increasing its total internal volume. However the hydraulic fluid level is only affected by the change in volume over the length of the fluid, not the entire length of the strut. In other words, the volume of hydraulic fluid doesn't change, its level drops as its container enlarges. The dilation of a cylinder due to internal pressure is given by a formula for a thick cylinder provided in "Mechanical Engineers Data Handbook" by James Carvill, published by Elsevier (Butterworth-Heinemann) Limited, ISBN-13 978-0750619608, and is stated as equation 6 as follows:

$$x_i = \frac{p r_i}{E} \left( \frac{r_0^2 + r_i^2}{r_0^2 - r_i^2} + v \right)$$

Where: P=pressure; E=Young's Modulus; v=Poisson's ratio; $r_o$=outer radius of strut; and $r_i$=inner radius of strut.

In the present embodiment, the wall thickness of the upper part 202 varies along its length and dilation will therefore vary throughout the length. Furthermore each section will be affected by the dilation of its surrounding sections. In the present embodiment, the upper part is approximated to 10 sections of equal length, applying equation 6 to each section. The change in volume $\Delta V$ of each section s is found by:

$$\Delta V_s = h_s \cdot \pi((r_{is}+x_{is})^2 - r_{is}^2)$$

and therefore $$\Delta V_s = h_s \cdot \pi(2r_{is}x_{is} + x_{is}^2)$$

where $h_s$ is the length of a given section and $x_{is}$ is the change in internal radius the given section. The total change in volume is the sum of the volume changes for each section that is below the fluid level. Thus the change in height $\Delta L_4$ of the hydraulic fluid due to dilation of the strut due to pressure is given by equation 7 as follows:

$$\Delta H_4 = -\frac{L_f \pi x_i (2r_i + x_i)}{A'_u}$$

where $A'_u$ is the expanded cross-sectional area of the upper section 202 and $L_f$ is the total length of the hydraulic fluid measured from the top of the main bearing R.

e) Thermal expansion of the strut: Thermal expansion of the upper part 202 causes both dilation and longitudinal change. The amount of thermal expansion is governed by the linear coefficient of expansion of the material from which the upper part 202 is manufactured. For example, given an upper part 202 formed from steel, the linear coefficient of expansion $\alpha_1$ is $11.5 \times 10^{-6\circ}$ $C.^{-1}$. As with the expansion due to pressure described above, the hydraulic fluid level is only affected by the expansion over the length of the fluid and not the entire length of the upper part 202. The expansion of the upper part 202 is defined by two expressions, one for dilation and one for extension. Thermal dilation is defined by an expansion of the internal radius $\Delta r_i$ of the upper part 202 as follows:

$$\Delta r_i = r_i \alpha_l \Delta T$$

The corresponding change in cross-sectional area $\Delta A$ is given by:

$$\Delta A = \pi(2r_i \Delta r_i + \Delta r_i^2)$$

and therefore:

$$\Delta A = \pi r_i^2 \alpha_l \Delta T (2 + \alpha_l \Delta T)$$

The subsequent change in volume of the fluid column is:

$$\Delta V = \Delta A \times L_f$$

where $L_f$ is the length of the fluid column measured from the plate above the floating piston 213. Therefore, the change in height $\Delta H_{5a}$ of the hydraulic fluid due to dilation of the strut due to thermal expansion is given by equation 8 as follows:

$$\Delta H_{5a} = -\frac{L_f \pi r_i^2 \alpha_l \Delta T (2 + \alpha_l \Delta T)}{A'_u}$$

The positive change in height $\Delta H_u$ of the section of the upper part 202 containing the fluid results in a corresponding drop or negative change in the level of the hydraulic fluid $\Delta H_{5b}$ defined in equation 9 as follows:

$$-\Delta H_{5b} = \Delta H_u = H_u \alpha_l \Delta T$$

The complete algorithm for the required hydraulic fluid level $H_r$ in the strut 201 taking into account the change in the hydraulic fluid level as a result of the above five factors can be stated in equation 10 as follows:

$$H_r = H_i + \Delta H_1 + \Delta H_2 + \Delta H_3 + \Delta H_4 + \Delta H_{5a} - \Delta H_{5b}$$

Thus given a required volume of hydraulic fluid for the strut 201 $V_r$ as the initial volume of hydraulic fluid $V_i$, the above equations provide the value of $H_r$, that is, the required level of hydraulic fluid in the strut 201 in its given state of temperature, pressure and closure C, for it to be correctly serviced.

Figure 4:
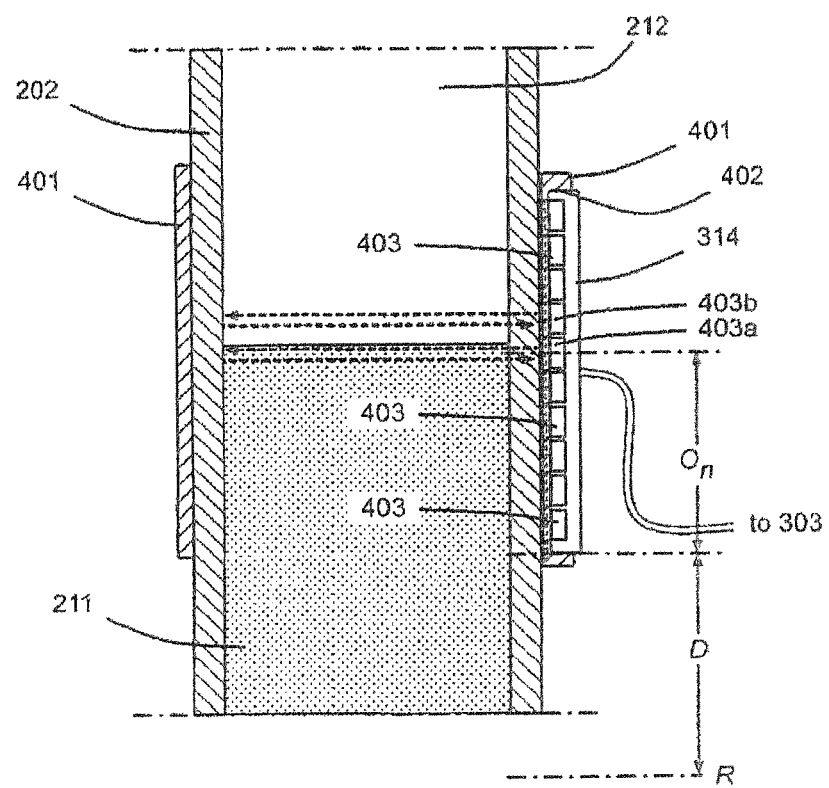
FIG. 4 is a cross sectional view of an ultrasonic fluid level detection sensor in the apparatus of FIG. 3.
Figure 5A:
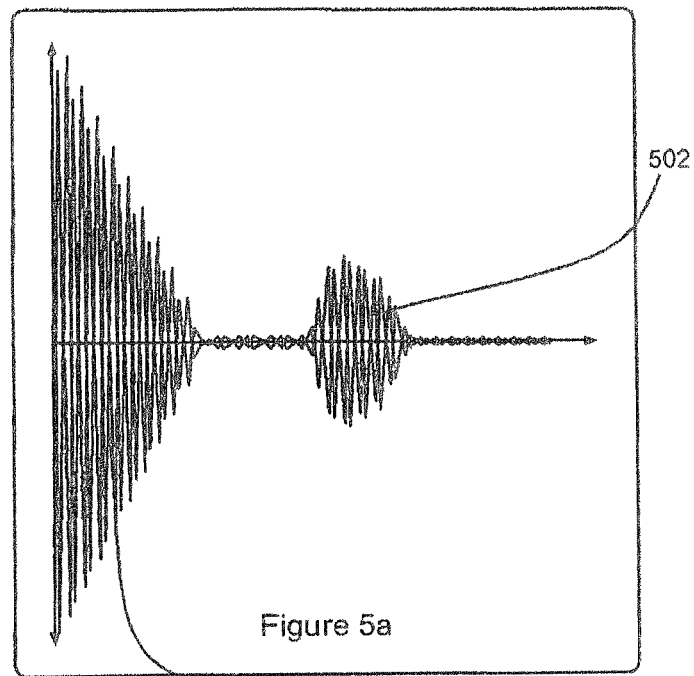
FIGS. 5a and 5b are graphs showing typical ultrasonic signal signatures used for fluid level detection in the sensor of FIG. 4.
Figure 5B:
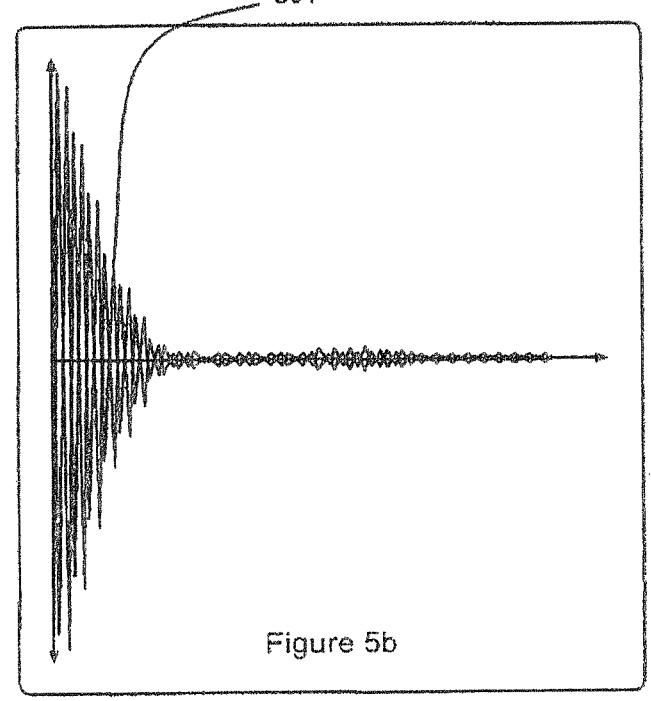

With reference to FIG. 4, a bracket 401 is fixed to the sidewall of the upper part 202 of the strut 201. The lower edge of the bracket 401 is placed at a predetermined distance above the reference point R in the form of the top of the main bearing of the strut 201. In the present embodiment, the bracket 401 is clamped to the sidewall. The bracket 401 comprises a slot 402 arranged to house the ultrasonic transducer linear array 314 abutting the sidewall in a position arranged to span the expected range of hydraulic fluid levels in the strut 201. In the present embodiment, the ultrasonic transducer array 314 comprises a vertical array of piezoceramic elements 403 each electrically connected to the ultrasonic sensor array controller 303. The ultrasonic transducer array 314 in the present embodiment is arranged to provide a 1 mm vertical resolution. In other words, the piezoceramic transducer elements 403 are spaced at 1 mm intervals. Each transducer element 403$n$ has an associated physical offset $O_n$ from the lower edge D of the sensor array 314. The ultrasonic transducer array 311 is arranged to operate in a frequency range of 1 MHz to 10 MHz. A layer of ultrasonic coupling material 404 is provided between the removable ultrasonic transducer array 314 and the part of the sidewall of the upper part 202 exposed within the slot of the bracket 401 to ensure good acoustic coupling with the strut 201.

In the present embodiment, the ultrasonic sensor array controller 303 operates each of the piezoceramic transducer elements 403 in sequence in a pulse-echo mode. In other words, each of the piezoceramic transducer elements 403 is operated to emit an ultrasonic pulse 405 through the sidewall of the strut 201 and then to receive any subsequent echo resulting from reflection of the emitted pulse by hydraulic fluid. FIG. 5$a$ shows a first initial ultrasonic pulse 501 emitted by one of the transducer elements 403$a$ and a corresponding echo 502 resulting from the reflection of the emitted pulse 501 by hydraulic fluid. FIG. 5$b$ shows another initial ultrasonic pulse 503 emitted by one of the transducer elements 403$b$ but no significant corresponding echo thus indicating the absence of hydraulic fluid. The ultrasonic sensor array controller 303 is arranged to analyse the responses from each of the transducer elements 403 to identify the transducer element nearest the boundary between pulses with corresponding echoes and pulses without. The offset O for the identified transducer element n relative to the known distance D of the array 314 from the reference point R thus provides the measured level of the hydraulic fluid $H_m$ within the upper part 202 of the strut 201 as follows:

$$H_m = D + O_n$$

Figure 6:
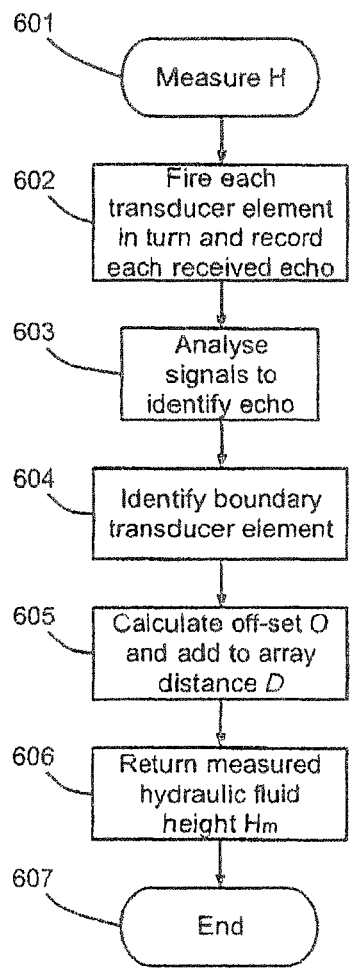
FIG. 6 is a flow chart illustrating processing performed by an ultrasonic sensor array controller in the apparatus of FIG. 3 when automatically servicing the strut of FIG. 2.

The processing performed by the ultrasonic sensor array controller 303 in order to measure the level of the hydraulic fluid $H_m$ within the upper part 202 of the strut 201 will now be described further with reference to the flow chart of FIG. 6. Processing is initiated at step 601 by request from the processor 301 and processing moves to step 602. At step 602 each transducer element 403 is fired in turn to produce an ultrasonic pulse 501, 503 and the corresponding response is recorded. Processing then moves to step 603 where the recorded responses are analysed to determine which comprise an echo 502 and processing moves to step 604. At step 604 the transducer element 403 is identified that represents the boundary between an echo 503 and no echo in the corresponding response. In the present embodiment, the transducer elements 403 are fired lowermost first and the last transducer element 403 at which an echo is received is treated as the boundary element and thus indicates the hydraulic fluid level. Processing then moves to step 605 where the physical off-set $O_n$, for the identified boundary transducer element 403 is calculated and added to the sensor array distance D above the reference point R and processing moves to step 606. At step 606 the measured hydraulic fluid height $H_m$ is returned to the processor 301. Processing then moves to step 607 and ends.

Figure 7:
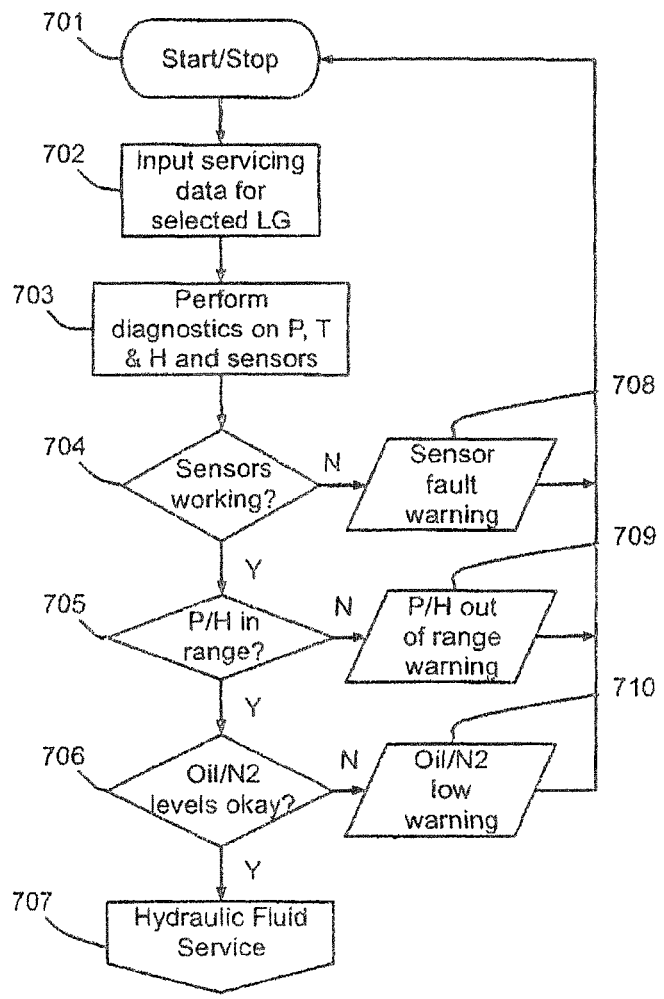
FIGS. 7 to 10 are flow charts illustrating processing performed by the processor of FIG. 3 when automatically servicing the strut of FIG. 2.

The processing performed by the processor 301 in response to a user start command entered via the user interface (UI) 302 will now be described further with reference to the flow charts of FIGS. 7, 8, 9 and 10. With reference to FIG. 7, processing is initiated at step 701 in response to the input user command via the UI 302 and processing moves to step 702 to perform a system diagnostics process. At step 702 the LG servicing data 304 for the landing gear indicated by the user via the UI 302 is input and processing moves to step 703. At step 703 a predetermined set of diagnostics procedures are performed on the height, pressure and temperature sensors 311, 312, 314 and processing then moves to step 704. If at step 704 the diagnostics procedures indicate that the sensors are working correctly then processing moves to step 705. At step 705 the current readings from the pressure and height sensors 311, 315 are checked against the input servicing data 304 to determine whether they fall within predetermined acceptable limits for servicing the relevant strut 201 and if so processing moves to step 706. At step 706 the levels in the hydraulic fluid supply 307 and gas supply 308 are checked via control signals issued to the hydraulic actuator 305 and the gas controller 306 respectively to determine whether they fall within respective predetermined minimums for servicing the strut and if so processing moves to step 707 to initiate a hydraulic fluid service process.

If at step 704 the diagnostic procedures indicate a fault or other issue with any one of the sensors 311, 312, 314 then processing moves to step 708 where an associated sensor fault warning is provided to the user via the UI 302 and processing returns to step 701 and stops. If at step 705 the current readings from the pressure and height sensors 311, 315 fall outside the acceptable service limits then processing moves to step 709 where an associated pressure or height warning is provided to the user via the UI 302 and processing returns to step 701 and stops. If at step 706 the current levels in the hydraulic fluid supply 307 and gas supply 308 do not meet their respective predetermined minimums then processing moves to step 710 where an associated fluid supply warning is provided to the user via the UI 302 and processing returns to step 701 and stops.

Figure 8:
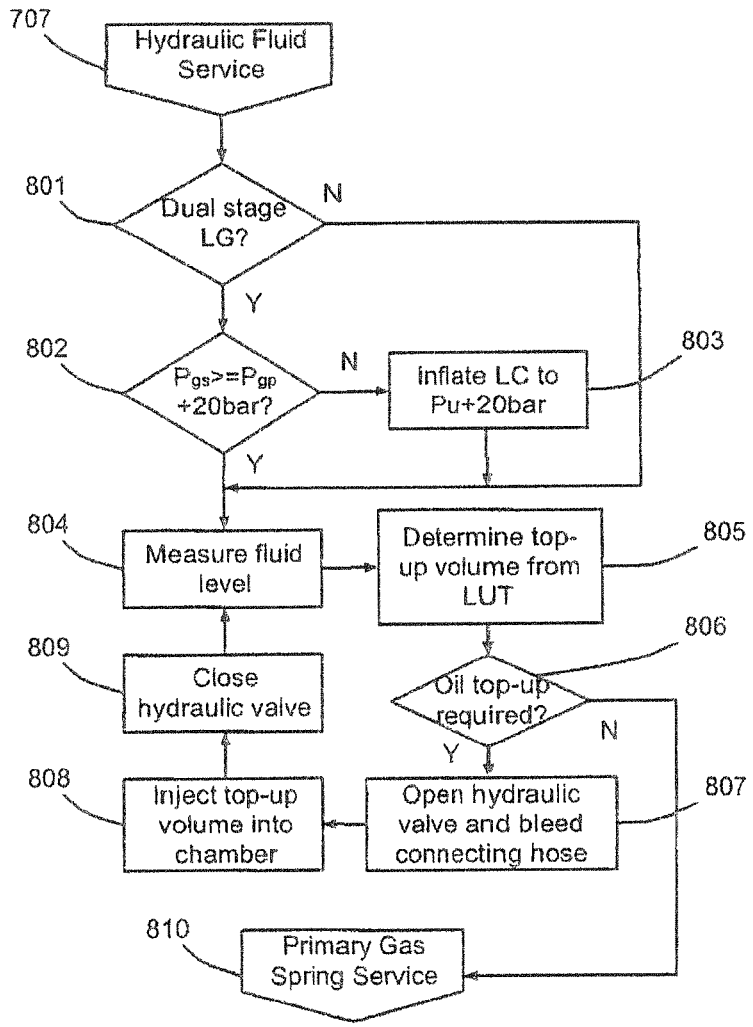

The hydraulic fluid service process will now be described further with reference to the flow chart of FIG. 8. Processing is initiated at step 707 from the system diagnostics process described above with reference to FIG. 7 and then moves to step 801. At step 801 the input servicing data 304 is checked to determine whether the strut is a dual stage arrangement as shown in FIG. 2 or a single stage. If the strut 201 is dual stage then processing moves to step 802. At step 802 the pressure differential $P_{gp}-P_{gs}$ between the primary and secondary gas springs 212, 218 is measured via the respective pressure sensors 311, 313 and if the pressure $P_{gs}$ in the secondary gas spring 218 is less than the pressure $P_{gp}$ in the primary gas spring 212 plus 20 bar then processing moves to step 803. At step 803 control signals are issued to the gas controller 306 and the lower manifold 310 to inflate the secondary gas spring 218 to the pressure $P_{gp}$ of the primary gas spring 212 plus 20 bar so as to ensure that the piston 213 is located in its uppermost position against the wall 214 and processing moves to step 804. At step 804 the measurement of the hydraulic fluid level is requested from the ultrasonic sensor array controller 303 and processing moves to step 805. At step 805 the required hydraulic fluid level $H_r$ in the strut 201 in its current state of temperature, pressure and closure C is determined from the hydraulic fluid look-up table in the servicing data 304 and processing moves to step 806. At step 806 if any top-up is required then processing moves to step 807. At step 807 control signals are issued to the upper manifold 309 and the hydraulic actuator 305 to bleed the upper manifold 309 and processing moves to step 808. At step 808 control signals are issued to the hydraulic actuator 305 to inject a predetermined volume of hydraulic for topping-up the strut into the upper valve 207 and processing moves to step 809. At step 809 the upper manifold 309 is closed and processing returns to step 804 to re-measure the hydraulic fluid level $H_m$ as described above. The process steps 804 to 809 are repeated until at step 806 no further top-up is required and processing then moves to step 810 to initiate servicing of the primary gas spring 212. If at step 801 the input servicing data 304 indicates that the strut is a single stage arrangement then processing moves straight to step 804. If at step 802 the pressure $P_{gs}$ in the secondary gas spring 218 equals or exceeds the pressure $P_{gp}$ in the primary gas spring 212 plus 20 bar then processing moves to step 804.

Figure 9:
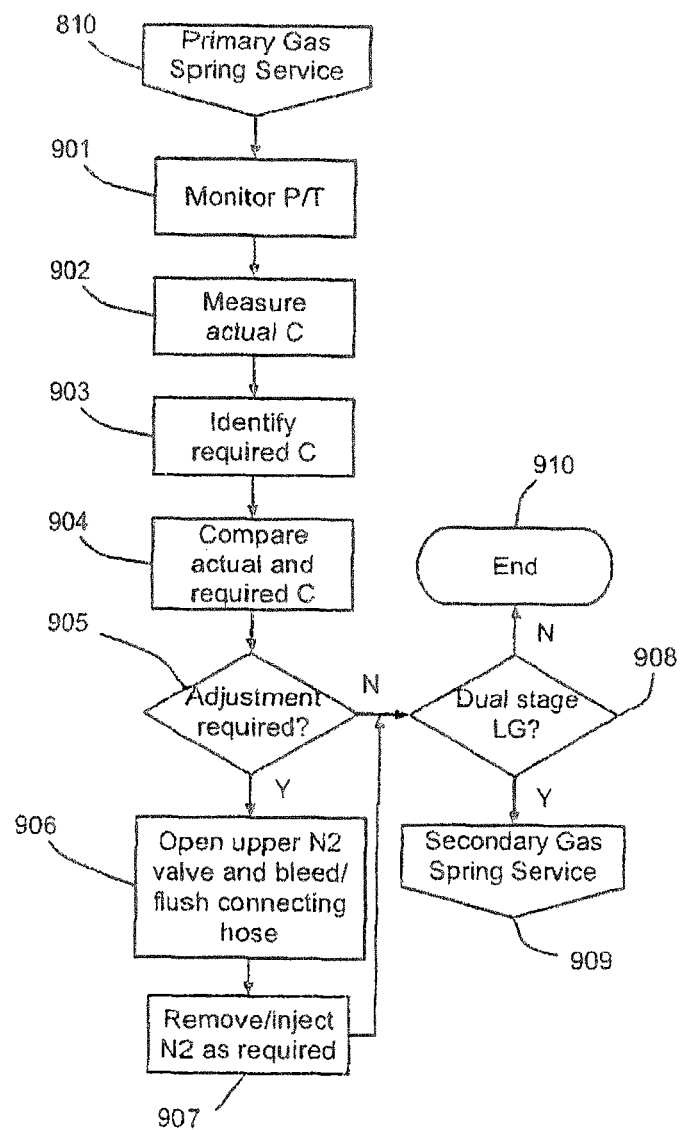

The primary gas spring service process will now be described further with reference to the flow chart of FIG. 9. Processing is initiated at step 810 from the hydraulic fluid replenishment process described above with reference to FIG. 8 and then moves to step 901. At step 901 the temperature T and pressure $P_{gp}$ for the primary gas spring 212 are monitored via the respective sensors 312, 311 in the upper manifold 309 and processing moves to step 902. At step 902 the current closure of the strut $C_m$ is input from the digital micrometer 315 and processing moves to step 903. At step 903 the required closure $C_r$ is determined from the LG servicing data 304 taking into account the measured pressure $P_{gp}$ and the temperature T and processing moves to step 904. At step 904 the measured closure $C_m$ and the required closure $C_r$ are compared and processing moves to step 905. At step 905 if adjustment of the primary gas spring piston 212 is required, that is, $C_m \neq C_r$, then processing moves to step 906. At step 906 control signals are issued to the upper manifold 309 to open and flush the gas connection from the gas controller 306 to the primary gas spring 212 and processing moves to step 907. At step 907 control signals are issued to the gas controller 306 so as to remove or inject gas until the digital micrometer 315 indicates that $C_m=C_r$ at which point processing moves to step 908. At step 908 if the servicing data 304 indicates that the strut 201 is a dual stage strut as in the present embodiment then processing moves to step 909 to initiate servicing of the secondary gas spring 218. If at step 908 the servicing data 304 indicates that the strut 201 is a single stage strut then processing moves to step 910 provides a successful serving message to the user via the UI 302 and ends. If at step 905 no adjustment is required then processing moves straight to step 908.

Figure 10:
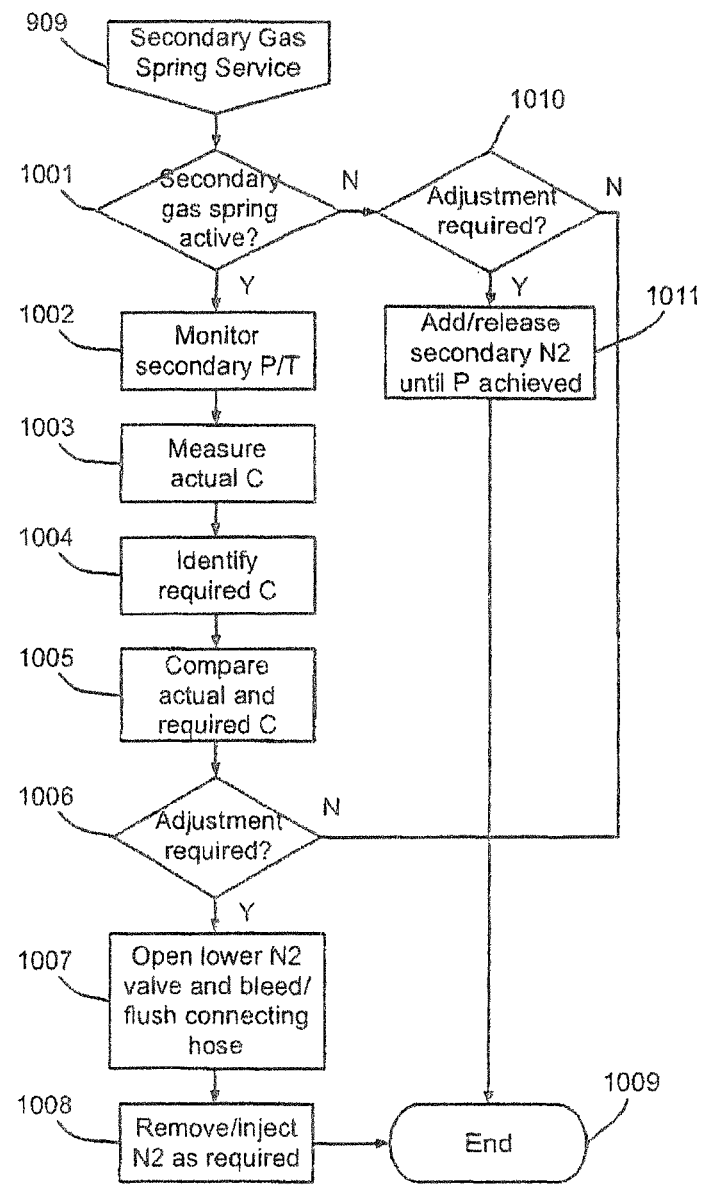

The secondary gas spring service process will now be described further with reference to the flow chart of FIG. 10. Processing is initiated at step 909 from the primary gas spring service process described above with reference to FIG. 9 and then moves to step 1001. At step 1001 if the current measured pressure $P_{gp}$ in the primary gas spring 212 is greater than the pressure $P_{gs}$ required for the secondary gas spring 218 to be active as defined in the servicing data 304 then processing moves to step 1002. At step 1002 the pressure $P_{gs}$ for the secondary gas spring 218 and the temperature T for the primary gas spring 212 are monitored via the respective sensors 313, 312 in the respective manifolds 310, 309 and processing moves to step 1003. At step 1003 the current closure of the strut $C_m$ is input from the digital micrometer 315 and processing moves to step 1004. At step 1004 the required closure $C_r$ is identified from the LG servicing data 304 taking into account the measured pressure $P_{gs}$ and the temperature T and processing moves to step 1005. At step 1005 the measured closure $C_m$ and the required closure $C_r$ are compared and processing moves to step 1006. At step 1006 if adjustment of the secondary gas spring 218 is required, that is, $C_m \neq C_r$, then processing moves to step 1007. At step 1007 control signals are issued to the lower manifold 310 to open and flush the gas connection from the gas controller 306 to the secondary gas spring 218 and processing moves to step 1008. At step 1008 control signals are issued to the gas controller 306 so as to remove or inject gas until the digital micrometer 315 indicates that $C_m=C_r$ at which point processing moves to step 1009, provides a successful servicing message to the user via the UI 302 and ends. If at step 1006 no adjustment is required then processing moves straight to step 1009. If at step 1001 if the current measured pressure $P_{gp}$ in the primary gas spring 212 is less than or equal to the pressure $P_{gs}$ required in for the secondary gas spring 218 to be active as defined in the servicing data 304 then processing moves to step 1010. At step 1010 the pressure in the secondary gas spring 218 is measured via the pressure sensor 313 and compared to the required inactive pressure $P_{gs}$ for the secondary gas spring 218 defined in the servicing data 304 and if adjustment is required then processing moves to step 1011. At step 1011 control signals are issued to the lower manifold 310 and the gas controller 306 to add or release gas to or from the secondary gas spring 218 so that the required inactive pressure $P_{gs}$ is met and processing then moves to step 1009 and ends as described above. If at step 1010 no adjustment is required then processing skips to step 1009 and ends as described above.

If the strut for a given landing gear is a single stage strut there is no secondary gas spring. As a consequence, as noted above with reference to step 908 of FIG. 9, the servicing procedure will end without the processing of FIG. 10 taking place. Furthermore, for such single stage struts, only the upper manifold 309 is required to be attached with the lower manifold 310 being redundant and left disconnected. In the present embodiment, the servicing data 304 for the relevant landing gear specifies whether the strut is a single or dual stage arrangement. As will be understood by those skilled in the art, some aircraft may have landing gear with a combination of single and dual stage struts. For example, the main landing gears may comprise dual stage struts while the nose landing gear may comprise a single state strut.

In another embodiment, instead of the servicing data comprising pre-calculated data for the expected or required hydraulic fluid level determination or for the expected or required strut closure for gas level determination. The required servicing levels are calculated as required by the processor in accordance with predetermined formulae provided in the serving data.

In a further embodiment, the dilation of the strut due to pressure is determined using empirical or analytic methods as a function of pressure. This pressure dilation data may then be stored in a look-up table for use when calculating the total internal volume of the strut as described herein.

In another embodiment, one or more of the hydraulic fluid level modifying factors may be omitted. This may reduce the required servicing data or calculation time. Some modifying factors may not be significant or applicable to a given suspension strut.

In a further embodiment, the user interface comprises a mimic display, that is, an animated display comprising a schematic of the servicing apparatus arranged to illustrate the progress of the servicing process and to provide other information to the user such as fault data.

In another embodiment, the servicing apparatus is arranged to automatically identify the landing gear to which is connected. Any suitable know means of identification may be employed such as an radio frequency identification (RFID) system, barcode or other wireless identification or verification system.

In a further embodiment, a part or a whole of the servicing apparatus is provided on-board the aircraft either fully or partially integrated with the aircraft systems or separately.

In another embodiment, the hydraulic fluid level is measured with the sensor array 314 of FIG. 4 but with the ultrasonic sensor array controller 303 arranged to operate using a reverberation decay method. The reverberation of the ultrasonic signal pulse from the ultrasonic sensor is monitored. Shorter reverberation times indicate the presence of fluid in the signal path. Therefore, the boundary transducer element can be identified from a change in the reverberation time and thus the level of fluid identified.

In a further embodiment, the ultrasonic sensor array controller is arranged to operate the ultrasonic transducer array 314 by firing all the transducer elements 403 simultaneously in either a pulse-echo mode or a reverberation mode for detecting the height of the hydraulic fluid.

In another embodiment, the ultrasonic sensor array controller and transducer are arranged to work as a phased array with pulse echo mode for detecting or measuring the level of the hydraulic fluid in the strut. The controller is arranged to calculate the position of the fluid level relative to the known position of the transducer and thus calculate the hydraulic fluid height $H_m$ within the upper part of the strut.

In a further embodiment, the lower manifold is also provided with a temperature sensor for directly measuring the temperature of the gas in the secondary gas spring.

In another embodiment, the servicing data is arranged to indicate an expected hydraulic fluid volume rather than a required level as described above. The servicing apparatus is then arranged to top-up the hydraulic fluid with the indicated volume so that the measured hydraulic fluid level equals the required hydraulic fluid level.

In a further embodiment, the change in volume of the strut due to pressure or temperature, that is thermal or pressure dilation, is determined from finite element (FE) modelling of the strut or from empirical studies of the strut in the required range of temperature and pressure conditions. Such data may then be utilised for the lookup tables in the servicing data for the required hydraulic fluid levels for the relevant range of temperature and pressure conditions for each applicable strut or landing gear.

As will be understood by those skilled in the art, the apparatus may be arranged to service a single type of suspension strut or a plurality of different suspension struts that may include single or multiple stage struts. Servicing data may be provided as required for each relevant type of strut.

As will be understood by those skilled in the art, the structure of any given suspension strut to which the apparatus may be applied may differ from that described or illustrated herein.

As will be understood by those skilled in the art, some struts may not be suitable for use with the through-wall ultrasonic transducer as described herein. For such struts other suitable methods and transducers for determining the level of hydraulic may be employed depending on the given application.

As will be understood by those skilled in the art, some aircraft may comprises landing gear with different struts, for example, between the nose landing gear and the main landing gear. In order to service such landing gear embodiments of the invention may comprises a set of fluid level and closure measurement transducers and a set of manifolds that provide for measurement and connection for the servicing of each type of strut present in the landing gear of a given aircraft. As will be understood by those skilled in the art, embodiments may be provided with a set of universal fluid level, closure measurement transducers and manifolds that provide for measurement and connection for the servicing any strut installed in any one of a predetermined set of aircraft.

As will be understood by those skilled in the art, the reference points for the closure of the strut or the level of hydraulic fluid are not limited to those described herein but may be selected as any suitable point for a given application of the servicing apparatus. Where different reference points are used, associated modifications to the calculations described herein may be necessary. Reference points are preferably robust and easily identifiable.

As will be understood by those skilled in the art, any suitable transducer may be used for measuring the closure C of the strut. The choice of transducer may depend on the reference points for the relevant strut, accessibility of the strut or environmental considerations. Any suitable transducer may be used such as a caliper and angle sensor, a draw-wire sensor, cable-extension transducer, string transducer or laser measurement device.

As will be understood by those skilled in the art, the servicing data may be updated manually, automatically via data connection or may be stored remotely and accessed via a wireless data connection as part of the LG servicing procedure. As will be understood by those skilled in the art, servicing data or servicing calculations as described herein may be performed remotely to the aircraft or strut being serviced and the results accessed via a suitable data communications link.

As will be understood by those skilled in the art, the servicing cart described herein is a mobile system and thus may comprise wheels, a braking system, a handle for manual movement or means for powering the wheels, a steering system, a power supply or protective bodywork systems. The servicing cart may be coupled to or integrated with another ground system associated with aircraft servicing.

It will be understood by those skilled in the art that the processing functionality of the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for servicing a landing gear strut in service while supporting an aircraft, wherein the landing gear strut includes a hollow upper strut part and a hollow lower strut part which is slidably coupled to the upper strut part such that the lower strut part extends and retracts from the upper strut part, the method comprising the steps of:
   measuring a level of damping fluid within the leading gear strut;
   measuring closure of the landing gear strut, wherein the closure is a distance that the lower strut part extends from the upper strut part;
   determining a required level of damping fluid for servicing of the landing gear strut based on the measured closure of the strut, wherein the required level varies with the closure of the landing gear strut; and
   adjusting an amount of damping fluid in the landing gear strut to cause an upper surface level of the damping fluid to be at the required level of damping fluid.

2. The method according to claim 1 in which the determination of the required level of damping fluid depends on a predetermined required damping fluid volume for servicing of the landing gear strut and an internal volume of a damping fluid chamber in the upper and lower strut parts of the landing gear strut for a predetermined range of strut closure.

3. The method according to claim 1 further comprising the steps of:
   measuring a temperature of the strut; and
   the determination of the required level of damping fluid further depends on a thermal expansivity of a required volume of damping fluid in the strut and the measured temperature.

4. The method according to claim 3 in which the measurement of the strut temperature uses one or more sensors associated with the strut.

5. The method according to claim 1 comprising the steps of:
   measuring a temperature of the strut; and
   the determination of the required level of damping fluid further depends on a thermal expansivity of a structure of the strut providing the damping fluid chamber and the measured strut temperature.

6. The method according to claim 1 comprising the steps of:
   measuring an interior pressure of the strut; and
   the determination of the required level of damping fluid further depends on a compression of a required volume of damping fluid in the strut in response to the measured pressure.

7. The method according to claim 1 comprising the steps of:
   measuring an interior pressure of the strut; and the determination of the required level of damping fluid further depends on a pressure dilation of the strut in response to the measured interior pressure.

8. The method according to claim 1 in which the measurement of the level of damping fluid level within the strut uses a sensor associated with the strut.

9. The method according to claim 8 in which the sensor comprises an ultrasonic transducer.

10. The method according to claim 8 in which the sensor comprises an ultrasonic transducer array.

11. The method according to claim 10 in which the ultrasonic array is driven in a pulse-echo mode.

12. The method according to claim 1 in which the measurement of the strut closure uses one or more sensors associated with the strut.

13. The method according to claim 1 further comprising the steps of:
   wherein the measurement of the closure is performed in response to the measured level of damping fluid complying with the determined required level of damping fluid;
   determining a required strut closure for correct servicing of a gas spring of the strut; and
   adjusting an amount of gas in the strut so that the measured strut closure complies with the required strut closure.

14. The method according to claim 13 in which the determination of the required strut closure depends on a temperature and an interior pressure of the strut.

* * * * *